United States Patent Office 3,256,268
Patented June 14, 1966

3,256,268
COPPER-CONTAINING NAPHTHOL-AZO-NAPHTHOL REACTIVE DYESTUFFS
Paul Dussy, St. Louis, France, assignor to J. R. Geigy A.-G., Basel, Switzerland
No Drawing. Filed Nov. 10, 1960, Ser. No. 68,361
Claims priority, application Switzerland, Nov. 13, 1959, 80,569
8 Claims. (Cl. 260—146)

The invention concerns metal-containing azo dyestuffs which can be fixed into cellulose fibres, processes for the production thereof, their use for the attainment of fast dyeings and the material dyed with the aid of these dyestuffs.

It has been found that metal-containing dyestuffs which corresponds to the general Formula I

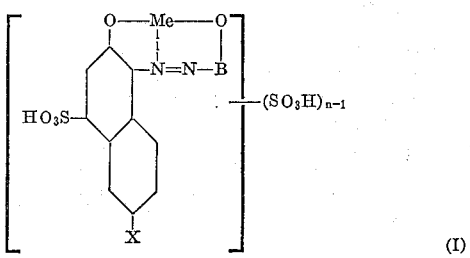

are distinguished by the relatively pure shades of the cellulose dyeings attained therewith.

In this formula:

X represents an amido group the organic radical of which contains at least one mobile substituent which reacts with alkalies while splitting off an anion. The organic radical of the amido group preferably contains at least one cyclic carbimide halide group

wherein "Hal" represents chlorine or bromine; thus is is preferably an azine ring of aromatic character having at least 2 tertiary ring N atoms and it contains at least one mobile halogen of the atomic numbers 17 to 35 at ring C atoms vicinal to the ring N atoms, or it is a carbacyl radical which contains such a halogenated azine ring, for example a 2,6-dichloro- or 2,6-dibromopyrimidyl-4-carbonyl radical or an m- or p-halogen azinylamino-benzoyl radical. The acid radicals of low halogen fatty acids are also suitable components of the amido group X, in particular the radicals of β-halogen fatty acids, for example, the β-chloro- or β-bromo propionyl and, in particular, the β-chloro or β-bromo-crotonyl radical. Also acid radicals which contain a sulphonic acid-β-halogen alkylamide substituent or a sulphated β-hydroxyalkylsulphonyl substituent, for example, benzoyl radicals substituted in this way, form the organic radical of the amido group X in the dyestuffs according to the invention.

B represents a 1-hydroxy-2-naphthyl radical substituted in the 8-position, in particular substituted in the 8-position by nucleophilic groups such as hydroxyl, low alkoxy, low acylamino and amino groups, which 1-hydroxy-2-naphthyl radical is also sulphonated, or a 1-hydroxy-2-naphthyl radical sulphonated in the 8-position and then possibly still further sulphonated, principally however, it is the 1-hydroxy-8-amino-5,7-disulpho-2-naphthyl radical.

Me represents a heavy metal of the periodic numbers 24 to 29, principally copper or, then, advantageously chromium or cobalt whereby the later two metals can also contain coordinatively bound uncoloured or coloured complex formers, for example the radicals of organic α- or β-hydroxy-carboxylic acids such as the radicals of the lactic acid, tartaric acid, salicylic acid, sulphonyl- and sulphamide- substituted salicylic acids, radicals of o,o'-dihydroxyazo dyestuffs which can be identical with or different from the azo dyestuffs as defined, radicals of o-hydroxy-o'-aminoazo dyestuffs or of o-hydroxy-o'-carboxyazo dyestuffs, n represents a positive whole number from 1 to 4.

Metal-containing dyestuffs according to the invention are distinguished by extraordinarily pure shades if B is the preferred 1-hydroxy-8-amino-5,7-disulpho-2-naphthyl radical and Me is copper. These copper-containing dyestuffs obtained according to the invention are, therefore, preferred. In addition, the metal-containing dyestuffs which according to the invention contain a trihalogen pyrimidylamino group as defined are distinguished not only by their good fixing powers on cellulose fibres, which enables relatively strong shades to be produced, but they are also distinguished by the relatively very good stability of the dyebaths and printing pastes produced therewith. They are also a preferred subject of this invention.

The dyestuffs according to the invention are produced by two different processes. The first consists in reacting metal-containing dyestuffs of the general Formula I wherein X is an acylatable amino group or a substituent containing an acylatable amino group, for example an m- or p-aminobenzoylamindo group, and Me and n have the meanings given above, with suitable acylating agents, the reaction being performed under such conditions that on completion thereof the dyestuff contains a substituent which easily reacts with alkalies while splitting off an anion, preferably a mobile halogen atom of the atomic numbers 17 to 35. Principally cyclic imide chlorides which contain several of the reactive groupings

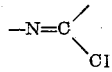

are employed as suitable acylating agents, in particular halogen azine compounds of aromatic character which contain at least 2 tertiary ring N atoms and at least two mobile halogen atoms of the atomic numbers 17 to 35 at ring C atoms vicinal to the N atoms such as, for example, 2,4,6-trichloro- or 2,4,6-tribromo-1,3,5-triazine, 2-alkoxy, or 2-alkyl-, or 2-phenyl-, or 2-amino-, or 2-alkylamino-, or 2-phenylamino-, or 2-sulphophenylamino-, or 2-ureido- or 2-guanidino- 4,6-dichloro- or -4,6-dibromo-1,3,5-triazines, 2,4- or 4,6-dichloro- or -dibromo-pyrimidines which in the remaining positions contain further substituents, in particular additional halogen atoms or negative groups such as nitro, acyl, cyano or also only alkyl or phenyl groups, and also tetrameric cyanogen chloride or bromide. Also β-halogen alkanoyl and, particularly, β-halogen alkenoyl halides containing halogens of the atomic numbers 17 to 35, of these in particular β-chloro- or β-bromo- crotonic acid chloride or bromide, also m-(β-chlorethylsulphamyl)-benzoyl chloride or m-(β-bromoethylsulphamyl)-benzoyl chloride can be used. The reaction conditions are so chosen that premature exchange of mobile groups does not take place either because of too high pH value of the reaction medium or because of too high temperature. Thus, the reaction is performed with the aqueous solutions of the alkali metal salts of the metal-containing dyestuffs at the lowest possible temperatures and pH values, possibly in the presence of agents which buffer the mineral acid such as alkali metal salts of low fatty acids, i.e. at pH values of about 2 to 8 and at temperatures of 0 to about 60° C., depending on the stability of the acylating agent or the mobility of the substituents which are to be exchanged in the group X. The acylating agents are used in at least equimolecular amounts and, depending on their properties, in fine dispersion, for example as suspensions or emulsions which are possibly produced with the aid of inert organic solvents which can be easily removed such as low ketones. When it is a primary amino group to be acylated, which is preferably the case, the acylating agents are allowed to act until the amino group can no longer be traced, for example by diazotising and coupling. The dyestuffs according to the invention must also be isolated and dried with care, for example by salting out of the alkali metal salts with sodium chloride in neutral to weakly acid solution and by drying at a moderately elevated temperature, preferably in vacuo.

The second process for the production of dyestuffs according to the invention consists in reacting agents introducing heavy metal of the periodic numbers 24 to 29 into starting dyestuffs of the general Formula II

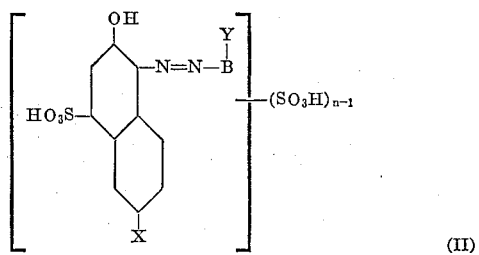

In the general Formula II

X and $n$ have the meanings given in general Formula I,

B represents a 2-naphthyl radical substituted in the 8-position and containing a substituent Y in the 1-position which radical can possibly be further substituted, in particular, sulphonated;

Y preferably represents the hydroxyl group or a substituent, including hydrogen, which can either easily be converted into the hydroxyl group or can easily be replaced by the hydroxyl group. In the most simple case, therefore, this is the metallisation of o,o'-dihydroxyazo dyestuffs under neutral or, preferably, weakly acid conditions.

Y, when it is a substituent which can be converted into the hydroxyl group is, for example, an acyloxy group, e.g. an acetyloxy, tosyloxy or carbalkoxy group or also a low alkoxy group. Examples of substituents which are easily replaced by the hydroxyl group are the halogens chlorine and bromine, the sulphonic acid group or hydrogen, the metallising process in the case of the two latter ortho-substituents being the hydroxylating coppering method in the presence of hydrogen peroxide. If Y is a hydroxyl group in the o-position, then the dyestuffs can be reacted with the usual agents giving off metal of the periodic numbers 24 to 29 provided the metallisation proceeds sufficiently easily in weakly acid medium at not too high temperatures, i.e., for example, with the mineral acid salts of copper, chromium or of cobalt in the presence of alkali salts of low fatty acids. However, also complex salts, in particular complex salts of the co-ordinative hexavalent metals chromium and cobalt which already contain uncoloured or coloured compounds bound in complex linkage can be used as agents introducing metal; in this case, particularly complex chromium compounds are employed which contain aromatic o-hydroxyaryl carboxylic acids or only one o,o'-dihydroxy, o-hydroxy-o'-amino or o-carboxy-o'-hydroxy azo dyestuff per metal atom. Mixed complexes of the dystuffs according to the invention are produced by this method. The details given above regarding the reaction and isolation conditions are naturally to be borne in mind in this case too. It is advantageous if, in the dyestuffs according to the invention, only X contains mobile substituents. However, for the production of this preferred class of dyestuffs according to the invention, this does not exclude the use of starting materials which contain still further amino groups. These amino groups are advantageously acylated with the usual acylating agents in any step before the acylation or azinylation according to the invention with agents introducing reactive groups, for example, they are acetylated, tosylated, benzoylated or methylsulphonated, or such amino groups should not be acylatable under the reaction conditions at all, for example, due to steric hindrance, e.g. by an o-sulphonic acid group or by substitution of the amino group or by partial substitution for example with aromatic radicals.

The starting dyestuffs used according to the invention, for the production of which no protection is claimed, are obtained, for example, by coupling 1-diazo-2-hydroxy-6-nitronaphthalene-4-sulphonic acid in an alkaline medium with 1-hydroxynaphthalene compounds coupling in the o-position to the hydroxyl group and substituted in the 8-position, the coupling possibly being performed in the presence of accelerating agents such as tertiary bases, and, in the azo dyestuff obtained reducing the nitro group to the amino group, e.g. with alkali or ammonium sulphides, possibly after the metallisation, e.g. with agents introducing chromium or before metallisation e.g. with agents introducing copper or cobalt. The metal-containing dyestuffs can then be converted according to the method discussed in the first production process into metal-containing reactive dyestuffs according to the invention. But the dyestuffs can also be first reacted before the metallisation with the agents listed above which introduce reactive substituents into the amino group and then converted into the dyestuffs according to the invention by the method mentioned above as second production process. Also, the metal-free or metal-containing dyestuffs can possibly first be reacted with m- or p-nitrobenzoyl chlorides and then the nitro group in the benzoyl derivative can be reduced to the amino group. The reaction then proceeds as described above. Examples of coupling components used in the processes described above are: 1,8-dihydroxynaphthalene, 1-hydroxy-5,8-dichloronaphthalene, 1-hydroxy-4-methylnaphthalene-8-sulphonic acid, 1-hydroxynaphthalene-5-sulphonic acid, 1,8-dihydroxynaphthalene-5-mono-or -5,7-disulphonic acid, 1-hydroxy-8-acetylamino- or -8-methylsulphonylamino- or -8 - phenylamino-naphthalene - 5-sulphonic acid, 1- hydroxy - 8-acetylamino-3,5-disulphonic acid and, advantageously, 1-hydroxy-8-aminonaphthalene-5,7-disulphonic acid which produces the most valuable purest copper-containing reactive dyestuffs according to the invention. For use for pad dyeing and printing of cellulose fibres, it is important that the reactive dyestuffs according to the invention in the form of their alkali metal salts dissolve very well even in a salt-containing and weakly acid aqueous liquor. The choice of components ensures this good solubility. This is done by ensuring that, in the copper-containing dyestuffs having 1 metal atom to 1 starting dyestuff, there are at least two and advantageously 3 or 4 sulphonic acid groups, these can be present in the diazo and the coupling component, but they can also be in the substituent Z, for example, in the form of 6-halogen-4-sulphophenylamino-1,3,5-triazinyl-(2)-amino groups. In cobalt-containing dyestuff of the proportions 2 starting dyestuffs to 1 metal atom, often 2 to 4 sulphonic acid groups in all are sufficient and, finally in the chromium-containing dyestuff of the type 2 starting dyestuffs to 1 chromium atom, 2 to 4 sulphonic acid groups in all are sufficient. With chromium-containing mixed complexes it is possible, on using 1:1 chromium complexes of higher sulphonated monoazo dyestuffs, also to use lower sulphonated dyestuffs as agents introducing chromium in the reaction with the starting materials used according to the invention, such as in the reaction of the 1:1 chromium complexes of the monoazo dyestuff 2-diazo - 1 - hydroxynaphthalene - 4,8-disulphonic acid→2- hydroxynaphthalene or of the monoazo dyestuff 4-chloro-2 - diazo - 1 - hydroxybenzene→ 1-hydroxynaphthalene-4,8-disulphonic acid with the reduced and acylated or halogen azinylated reaction products, used according to the invention, of the coupling of 6-nitro-2-hydroxy-1-diazonaphthalene with 1-hydroxynaphthalenes, for example with 1-hydroxy-5,8-dichloronaphthalene.

As the coupling energy of the nitrated 1-diazo-2-hydroxynaphthalene-4-sulphonic acid is limited, also the dyestuffs obtained by hydroxylating coupling are suitable in particular for the production of copper-containing 1:1 complexes according to the invention. Diazonaphthalene sulphonic acids having the o-position to the diazo group free or occupied by a sulphonic acid group can be coupled in a known manner in an alkaline medium with 2-acylamino - 6 - hydroxynaphthalene-8-sulphonic acid, the o-hydroxyazo dyestuff converted with copper salts in the presence of hydrogen peroxide into the complex copper compound of the corresponding o,o'-dihydroxyazo dyestuff, the acylamino group can be saponified in any step into the amino group and the copper-containing aminoazo dyestuff can be acylated or azinylated according to the invention.

Similarly, by a process which is also known, 6-nitro-1,2-naphthoquinone-4-sulphonic acid or its salts can be condensed with 2-naphthyl hydrazine sulphonic acids to 6-nitro-2-hydroxynaphthyl azonaphthalene sulphonic acids or their salts, the nitro group reduced to the amino group and then, in any order desired, the amino group can be acylated or azinylated according to the invention and the dyestuff coppered by hydroxylation in the presence of hydrogen peroxide. If desired, the dyestuffs so produced can also be de-coppered in any suitable step, for example in the warm with ethylenediamine tetra-acetic acid or with the alkali metal salts thereof in aqueous solution, and then the o,o'-dihydroxyazo dyestuff so obtained can again be reacted with the desired agent introducing metal.

Dyestuffs according to the invention or usable according to the invention are obtained by the two processes described above, which dyestuffs, because of insufficient coupling energy, cannot be obtained direct from 1-diazo-2 - hydroxy - 6 - nitronaphthalene-4-sulphonic acid, for example dyestuffs of the general formula I in which B is the radical of 1 - hydroxynaphthalene - 6,8-disulphonic acid (from 2-diazonaphthalene-6,8-disulphonic acid).

Further details regarding the production of the dyestuffs according to the invention will be seen from the following examples.

Particularly valuable dyestuffs correspond to the formula

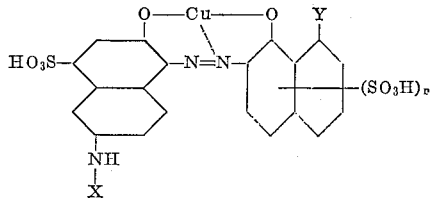

wherein

X represents the radical of an acid halide which contains a substituent, in particular halogen having atomic numbers 17 and 35, which, with alkalies, splits off as anion, Y represents a member selected from the group consisting of

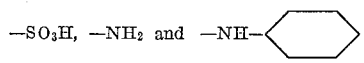

and $n$ represents a whole positive number of at most 2.

Examples of the reactive radical X are principally:

(a) Halogen-pyrimidyl radicals such as dihalogen pyrimidyl radicals which contain a substituent in the remaining position, in particular a further halogen atom, such as, e.g. 4,5,6-trichloropyrimidyl-(2) or 2,5,6-trichloropyrimidyl-(4) radical, (b) Halogen-1,3,5-triazinyl radicals which in the remaining position contain a substituent, in particular halogen amino groups or alkoxy groups, e.g. the 2,4-dichloro- or 2-methoxy-4-chloro-1,3,5-triazinyl radicals, (c) β-Halogen fatty acid radicals such as β-halogen alkanoyl radicals and, particularly, β-halogen alkenoyl radicals such as, e.g. the β-chlorocrotonyl radical. The radical X can also be halogen pyrimidoyl radicals and m-(β-halogen ethylsulphamyl)-benzoyl radicals. Halogen in the radicals mentioned is, in particular, chlorine but it can also be bromine.

Dyestuffs containing the 1-oxy-8-amino-5,7-disulphonaphthyl-(2) radical as the 1-oxy-naphthyl-(2) radical substituted in the 8-position are particularly valuble; also the 1-oxy-4,8-disulphonaphthyl-(2) radical is preferred.

In addition, dyestuffs which contain the trichloro-pyrimidylamino group are preferred. It is difficult to determine from the dyestuff molecule which halogen atom of the tetrahalogen pyrimidine is exchanged for the dyestuff amino radical. Very probably the latter radical is bound to the pyrimidine ring in the 2- or 4-position. In this case, the halogen atoms are in the 4,5,6- or 2,5,6-positions. This radical thus has the structure

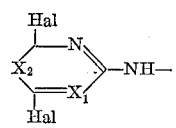

in which of $X_1$ and $X_2$ one is tertiary nitrogen (=N—) and the other is =C-Hal.

The heavy metal-containing dyestuffs obtained by the processes described above are dark powders which, in the form of their alkali metal salts, dissolve very well in water. They are suitable for the dyeing and printing of natural and synthetic polyamide fibres such as wool, nylon etc., and of natural and regenerated cellulose fibres in violet, blue-violet, blue, navy blue to black shades. The cellulose material is impregnated or printed with the possibly thickened dyestuff solution, advantageously at a low temperature, e.g. at 20–50° C., and then the dyestuff is fixed by treating with acid binding agents. Examples of such agents are sodium carbonate, potassium carbonate, di- and tri-sodium phosphate, caustic soda lye and, at temperatures of above 50° C., also potassium or sodium bicarbonate can be used. Although the treatment with these agents can be performed even at room temperature or at a slightly raised temperature, it is often performed with better results at a raised temperature of, e.g., 70–160° C. (advantageously after a mild intermediate drying of the impregnated or printed goods). Instead of this alkaline after-treatment, the acid binding agent can even be added to the impregnating liquors or printing pastes and then the dyeing is developed either by a short heating at temperatures of over 100° C. to 160° C. or by storing for a considerable time at room temperature. In this process, the addition of hydrotropic agents to the printing inks and impregnating liquors is of advantage, for example the addition of urea in amounts of 10 to 200 g. per litre of dyeing agent.

The new dyestuffs are chemically bound to the fibre by the treatment with acid binding agents and, after soaping to remove non-fixed dyestuff, the cellulose dyeings obtained thereby have excellent wet fastness properties and very good light fastness.

The following examples serve to illustrate the invention. The temperatures are in degrees Centigrade. Where not otherwise stated, parts are given as parts by weight. Their relationship to parts by volume is as that of grammes to cubic centimetres.

Example 1

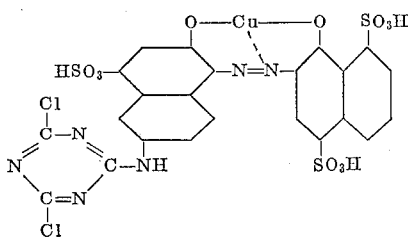

29.5 parts of 6-nitro-1-diazo-2-hydroxynaphthalene-4-sulphonic acid in the presence of 40 parts of sodium carbonate are coupled at 20–25° with the solution of the sodium salt of 30.3 parts of 1-hydroxynaphthalene-4,8-disulphonic acid in 500 parts of water. On completion of the coupling, the solution is heated to 90–95° and the nitro group is reduced at 90–95° while stirring for 1 hour, with 43 parts of crystallised sodium sulphide. The amino monoazo dyestuff is precipitated with acetic acid, filtered off and, at 80–85°, dissolved in 500 parts of water. Animal charcoal is added to the dyestuff solution to clarify, then 30 parts of crystallised sodium acetate and 25 parts of crystallised copper sulphate are added and the whole is stirred for 1 hour at 80–85°. Sufficient sodium carbonate is added to the solution of the copper containing dyestuff at 20–25° to adjust the pH to 6.5–7.0.

20.0 parts of cyanuric chloride dissolved in 100 parts of acetone and the solution is poured while stirred vigorously into 200 parts of ice water. The solution of the copper-containing aminomonoazo dyestuff is poured into the suspension obtained within 1½ hours at 0–5°, care being taken by the simultaneous addition of sodium carbonate that the pH of the mixture is between 4.0–4.5. As soon as no more free amino groups can be traced, the reaction product is precipitated by the addition of sodium chloride, filtered off and well washed with dilute sodium chloride solution. After drying in vacuo at 20–25°, the copper-containing dyestuff is a black powder which dissolves in water with a blue colour.

If cotton is treated in the foulard at 20° with a 1% solution of the new dyestuff with the addition of 15 g. of sodium carbonate per litre, rolled up, left for 2 hours at room temperature, then raised and soaped for 30 minutes at the boil, then a reddish blue dyeing is obtained which has good fastness to light and very good fastness to washing.

Dyestuffs having similar properties are obtained if in the above example, the 1-hydroxynaphthalene-4,8-disulphonic acid is replaced by the same number of parts of 1-hydroxynaphthalene-5,8-disulphonic acid or 1-hydroxynaphthalene-5,8-disulphonic acid or 1-hydroxynaphthalene-6,8-disulphonic acid.

Copper-containing dyestuffs having similar properties are also obtained if in the above examples, the cyanuric chloride is replaced by the equivalent amount of one of the acylating agents given in the following Table I, and if the new dyestuffs are dyed by one of the application methods given in the following examples then dyeings having similar fastness properties are obtained.

TABLE I

| No. | Acylating agent | Reaction at— pH | Reaction at— Temperature, degrees | Shade of cellulose dyeing |
|---|---|---|---|---|
| 1 | 2,4,6-trichloropyrimidine | 6.0–6.5 | 40–45 | Reddish blue. |
| 2 | 2,4,5,6-tetrachloropyrimidine | 6.0–6.5 | 40–45 | Do. |
| 3 | 5-bromo-2,4,6-trichloropyrimidine | 6.0–6.5 | 30–35 | Do. |
| 4 | 5-methyl-2,4,6-trichloropyrimidine | 7.0–7.5 | 80–85 | Do. |
| 5 | 2-amino-4,6-dichloro-1,3,5-triazine | 5.0–5.5 | 30–35 | Do. |
| 6 | 2-ureido-4,6-dichloro-1,3,5-triazine | 5.0–5.5 | 30–35 | Do. |
| 7 | 2-phenylamino-4,6-dichloro-1,3,5-triazine | 6.0–6.5 | 40–45 | Do. |
| 8 | 2-(2'-sulphophenylamino)-4,6-dichloro-1,3,5-triazine. | 6.0–6.5 | 40–45 | Do. |
| 9 | 2-(2'-chloro-5'-sulphophenylamino)-4,6-dichloro-1,3,5-triazine | 6.0–6.5 | 40–45 | Do. |
| 10 | 2-methoxy-4,6-dichloro-1,3,5-triazine | 5.0–5.5 | 30–35 | Do. |
| 11 | β-Chloropropionyl chloride | 6.5–7.0 | 30–35 | Do. |
| 12 | β-Chlorocrotonic acid chloride | 6.5–7.0 | 30–35 | Do. |
| 13 | β-Bromocrotonic acid bromide | 6.5–7.0 | 30–35 | Do. |
| 14 | β-Chloroacrylic acid chloride | 6.5–7.0 | 30–35 | Do. |
| 15 | m-(β-Chloroethylsulphamyl)-benzoyl chloride | 6.5–7.0 | 30–35 | Do. |
| 16 | 2,6-dichloropyrimidine-4-carboxylic acid chloride. | 6.5–7.0 | 30–35 | Do. |
| 17 | Chloromalic acid anhydride | 6.5–7.0 | 30–35 | Do. |
| 18 | 2-hydroxyethylamino-4,6-dichloro-1,3,5-triazine | 6.0–6.5 | 40–45 | Do. |
| 19 | Cyanuric bromide | 2.5–3.0 | 0–5 | Do. |
| 20 | Tribromopyrimidine | 6.0–6.5 | 40–45 | Do. |
| 21 | β-Bromopropionyl chloride | 6.5–7.0 | 30–35 | Do. |

Example 2

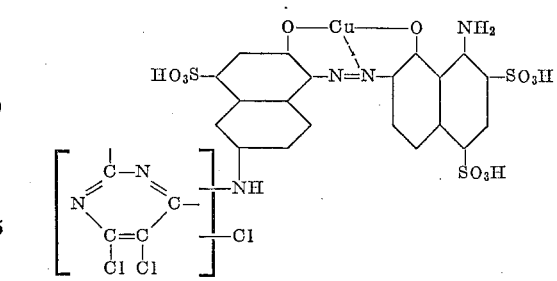

29.5 parts of 6-nitro-1-diazo-2-hydroxynaphthalene-4-sulphonic acid are coupled at 20–25° in the presence of 40 parts of sodium carbonate, with 31.9 parts of 1-amino-8-hydroxynaphthalene-2,4-disulphonic acid. On completion of the coupling, the solution is heated to 90–95°, 43 parts of crystallised sodium sulphide are added and the whole is stirred for 60 minutes at this temperature. The amino monoazo dyestuff formed is precipitated at room temperature with mineral acid and sodium chloride, filtered off, washed with mineral acid sodium chloride solution and again dissolved in 200 parts of water with the addition of sodium acetate at 40–45°, and the solution is clarified by the addition of animal charcoal. 25 parts of crystallised copper sulphate dissolved in 100 parts of water are then added and the whole is stirred for 1 hour at 40–45°. The pH of the solution is then adjusted to 6.0–6.5 with sodium carbonate. 21.8 parts of 2,4,5,6- tetrachloropyrimidine are sprinkled in within 3 hours at 40–45°, the pH being kept at 6.0–6.5 by the gradual addition of sodium carbonate. As soon as no more free amino groups can be traced, the new dyestuff, which is an isomeric mixture of 2,5,6-trichloropyrimidinyl-(4)-aminoazo dyestuff and 4,5,6-trichloropyrimidinyl-(2)-aminoazo dyestuff, is precipitated by the addition of 20 volume percent of sodium chloride and 10 volume percent of potassium chloride. It is filtered off and dried in vacuo at 40–45°. The copper-containing dyestuff is a black powder which dissolves in water with a blue colour.

If cotton is treated at 50° in the foulard with a 2% solution of this dyestuff which also contains 5% of urea and 1% of sodium carbonate, then dried at 80°, then steamed for 5–10 minutes at 100–110° and soaped at the boil, a deep, pure blue dyeing is obtained which has good fastness to light and excellent fastness to washing.

Similar dyestuffs are obtained if in the above example, instead of the 2,4,5,6-tetrachloropyrimidine, the equimolecular amount of one of the acylating agents given in the following table is used, or if instead of 1-amino-8-hydroxynaphthalene-2,4-disulphonic acid the equimolecular amount of 1-amino-8-hydroxynaphthalene-2-sulphonic acid or of 1-phenylamino-8-hydroxynaphthalene-4,6-disulphonic acid is used for the coupling.

per sulphate dissolved in 100 parts of water are then added and the whole is stirred at 40–45° for 1 hours. The metallised dyestuff is precipitated with sodium chloride and potassium chloride, filtered off and dried in vacuo at 60–80°. It is identical with the dyestuff obtained according to Example 2.

*Example 4*

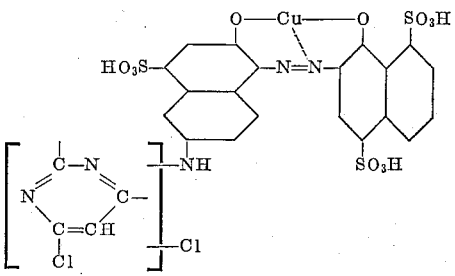

23.9 parts of 2 - amino - 6 - hydroxynaphthalene-8-sulphonic acid are dissolved in 250 parts of water and the reaction is made neutral with sodium carbonate. 20.0 parts of 2,4,6-trichloropyrimidine are added dropwise to the solution within 2 hours at 40–45°, the reaction of

TABLE II

| No. | Acylating agent | Reaction at— | | Shade of cellulose dyeing |
|---|---|---|---|---|
| | | pH | Temperature, degrees | |
| 1 | 2,4,6-trichloropyrimidine | 6.0–6.5 | 40–45 | Blue. |
| 2 | 5-bromo-2,4,6-trichloropyrimidine | 6.0–6.5 | 30–35 | Do. |
| 3 | 5-methyl-2,4,6-trichloropyrimidine | 7.0–7.5 | 80–85 | Do. |
| 4 | 2-amino-4,6-dichloro-1,3,5-triazine | 5.0–5.5 | 30–35 | Do. |
| 5 | 2-ureido-4,6-dichloro-1,3,5-triazine | 5.0–5.5 | 30–35 | Do. |
| 6 | 2-phenylamino-4,6-dichloro-1,3,5-triazine | 6.0–6.5 | 40–45 | Do. |
| 7 | 2-(2′-sulphophenylamino)-4,6-dichloro-1,3,5-triazine | 6.0–6.5 | 40–45 | Do. |
| 8 | 2-(2′-methyl-5′-sulphophenylamino)-4,6-dichloro-1,3,5-triazine | 6.0–6.5 | 40–45 | Do. |
| 9 | 2-methoxy-4,6-dichloro-1,3,5-triazine | 5.0–5.5 | 30–35 | Do. |
| 10 | β-Chloropropionyl chloride | 6.5–7.0 | 30–35 | Do. |
| 11 | β-Chlorocrotonic acid chloride | 6.5–7.0 | 30–35 | Do. |
| 12 | β-Bromocrotonic acid chloride | 6.5–7.0 | 30–35 | Do. |
| 13 | β-Chloroacrylic acid chloride | 6.5–7.0 | 30–35 | Do. |
| 14 | m-(β-Chloroethylsulphamyl)-benzoyl chloride | 6.5–7.0 | 30–35 | Do. |
| 15 | 2,6-dichloropyrimidine-4-carboxylic acid chloride. | 6.5–7.0 | 30–35 | Do. |
| 16 | Chloromaleic acid anhydride | 6.5–7.0 | 30–35 | Do. |
| 17 | Cyanuric chloride | 2.5–3.0 | 0–5 | Do. |
| 18 | Cyanuric bromide | 2.5–3.0 | 0–5 | Do. |
| 19 | Tribromopyrimidine | 6.0–6.5 | 40–45 | Do. |
| 20 | β-Bromopropionyl chloride | 6.5–7.0 | 30–35 | Do. |

*Example 3*

29.5 parts of 6-nitro-1-diazo-2-hydroxynaphthalene-4-sulphonic acid are coupled at 20–25° in the presence of 40 parts of sodium carbonate with 31.9 parts of 1-amino - 8 - hydroxynaphthalene-2,4-disulphonic acid. On completion of the coupling, the solution is heated to 90–95°, 43 parts of crystallised sodium sulphide are added and the whole is stirred for 60 minutes at this temperature. The amino monoazo dyestuff formed is precipitated with mineral acid and sodium chloride at room temperature, filtered off, washed with mineral acid sodium chloride solution, dissolved in 200 parts of water with the addition of sodium carbonate so that the reaction is neutral and animal charcoal is added to the solution to clarify. 21.8 parts of 2,4,5,6-tetrachloropyrimidine are then sprinkled in within 3 hours at 40–45°, the pH of the mixture being kept at 6.0–6.5 by the gradual addition of sodium carbonate. As soon as no more free amino groups can be traced, the new dyestuff is precipitated with sodium chloride, filtered off and again dissolved in 200 parts of 40° warm water. 30 parts of sodium acetate and 25 parts of crystallised copthe mixture being kept neutral all the time by the simultaneous addition of an aqueous sodium carbonate solution. As soon as no more free amino groups can be traced, the reaction product is precipitated with sodium chloride, filtered off and washed with dilute sodium chloride solution. The filter cake is added within 15 minutes to a suspension, prepared in the usual way, of the diazo compound of 30.0 parts of 2-aminonaphthalene-4,8-disulphonic acid neutralised with sodium carbonate and to which has been added 20.0 parts of sodium bicarbonate. As soon as the coupling is complete, the pH of the reaction mixture is adjusted with dilute acetic acid to 5.0 and then 50 parts of crystallised sodium acetate and a solution of 28.0 parts of copper sulphate (5H₂O) in 100 parts of water are added. 180 parts of 5% hydrogen peroxide are then added dropwise within 1 hour at 20–25° and the whole is stirred for 20 hours at 20–25°. The uncoppered dyestuff has disappeared at the end of this time. The new reactive dyestuff, which is an isomeric mixture of 2,6-dichloropyrimidinyl - (4) - aminoazo dyestuff and 4,6 - dichloropyrimidinyl-(2)-aminoazo dyestuff, is precipitated with sodium chloride, filtered off and washed with dilute sodium chloride solution. It is a black powder which dissolves in water with a deep blue colour.

If cotton is treated at 50° in the foulard with a 1% solution of this dyestuff which also contains 20 g. of sodium carbonate and 200 g. of urea per litre, the impregnated goods are dried, then heated for 4 minutes at 140–160° and finally soaped at the boil for 30 minutes, then a level, reddish-blue dyeing which is fast to washing is obtained.

Similar dyestuffs are obtained if in the above example instead of the 30.3 parts of 2-aminonaphthalene-4,8-disulphonic acid, the same amount of 2-aminonaphthalene-5,7-disulphonic acid or 2-aminonaphthalene-6,8-disulphonic acid is used and otherwise analogous procedure is followed.

Also new dyestuffs having similar properties are obtained if in the above example, instead of the 20.0 parts of 2,4,6-trichloropyrimidine, the equimolecular amount of one of the acylating agents given in the following table is used.

| No. | Acylating agent | Reaction at— | | Shade of cellulose dyeing |
| --- | --- | --- | --- | --- |
| | | pH | Temperature, degrees | |
| 1 | Cyanuric chloride | 2.5–3.0 | 0–5 | Blue. |
| 2 | 2,4,5,6-tetrachloropyrimidine | 6.0–6.5 | 40–45 | Do. |
| 3 | 5-bromo-2,4,6-trichloropyrimidine | 6.0–6.5 | 30–35 | Do. |
| 4 | 5-methyl-2,4,6-trichloropyrimidine | 7.0–7.5 | 80–85 | Do. |
| 5 | 2-amino-4,6-dichloro-1,3,5-triazine | 5.0–5.5 | 30–35 | Do. |
| 6 | 2-ureido-4,6-dichloro-1,3,5-triazine | 5.0–5.5 | 30–35 | Do. |
| 7 | 2-phenylamino-4,6-dichloro-1,3,5-triazine | 6.0–6.5 | 40–45 | Do. |
| 8 | 2-(2'-sulphophenylamino)-4,6-dichloro-1,3,5-triazine. | 6.0–6.5 | 40–45 | Do. |
| 9 | 2-(2',5'-dimethylphenylamino)-4,6-dichloro-1,3,5-triazine. | 6.0–6.5 | 40–45 | Do. |
| 10 | 2-methoxy-4,6-dichloro-1,3,5-triazine | 5.0–5.5 | 30–35 | Do. |
| 11 | 2,6-dichloropyrimidine-4-carboxylic acid chloride. | 6.5–7.0 | 30–35 | Do. |
| 12 | β-Chloropropionyl chloride | 6.5–7.0 | 30–35 | Do. |
| 13 | β-Chlorocrotonic acid chloride | 6.5–7.0 | 30–35 | Do. |
| 14 | β-Bromocrotonic acid bromide | 6.5–7.0 | 30–35 | Do. |
| 15 | β-Chloroacrylic acid chloride | 6.5–7.0 | 30–35 | Do. |
| 16 | m-(β-Chloroethylsulphamyl)-benzene chloride. | 6.5–7.0 | 30–35 | Do. |
| 17 | Chloromaleic acid anhydride | 6.5–7.0 | 30–35 | Do. |
| 18 | 2-hydroxyethylamino-4,6-dichloro-1,3,5-triazine | 6.0–6.5 | 40–45 | Do. |

*Example 5*

Cotton or staple rayon is printed by one of the usual methods with the following printing colour:

30 parts of the dyestuff obtained according to Example 2
200 parts of urea
400 parts of water
350 parts of sodium alginate, 5% aqueous solution
20 parts of potassium carbonate 1000 parts After drying, the goods are steamed neutral for 10–15 minutes or fixed for 5 minutes at 145–150°. They are then well rinsed and soaped at the boil for 30 minutes. The deep, pure, blue print has excellent wet fastness properties.

The printing paste described above stores well.

*Example 6*

2 parts of the dyestuff obtained according to Example 2 are dissolved in 5000 parts of water at 40°. Then 0.5 part of a non-ionogenic dispersing agent, for example the reaction product from 25 mols of ethylene oxide and 1 mol of octodecyl alcohol or octodecylamine are added, then 6 parts of acetic acid and, finally, 0.5 part of a polyquaternary ammonium compound, for example the condensation product from 11.5 parts of N,N',N''-pentamethyldiethylenetriamine and 14.3 parts of β,β'-dichlorodimethyl ether, are added. 100 parts of wool are introduced into the dyebath so obtained, the bath is brought to the boil within 30 minutes and dyeing is performed for 1 hour at this temperature. 4 parts of 25% ammonia are then added and the bath is boiled for another 30 minutes. The goods are then rinsed, 3 parts of 85% formic acid to 100 parts of water being added to the last rinsing bath. A level, pure, blue dyeing is obtained which has good fastness to light, rubbing, water and washing.

What I claim is:

1. The monoazo dyestuff of the general formula

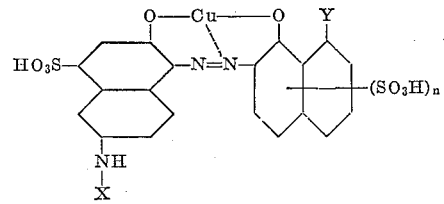

wherein

X represents a member selected from the group consisting of (a) dihalogen-1,3,5-triazinyl, (b) monohalogen-1,3,5-triazinyl wherein the halogen-free position of the triazinyl ring is substituted by a member selected from the group consisting of amino, phenylamino, ureido, monosulfophenylamino, methylsulfophenylamino, chlorosulfophenylamino, methoxy, hydroxyethylamino and dimethylphenylamino, (c) radical of the formula

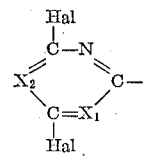

wherein one of $X_1$ and $X_2$ is =N—, and the other is a moiety selected from the group consisting of

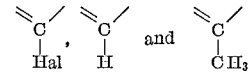

and (d) β-halogen lower fatty acid radicals, the halogen having atomic numbers 17 and 35, Y represents a member selected from the group consisting of —$SO_3H$, —$NH_2$ and

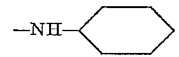

and $n$ represents a whole positive number of at most 2.

2. The monoazo dyestuffs of the general formula

[structure with Cu complex, HO$_3$S, NH$_2$, SO$_3$H, N=N, NH-X]

wherein X represents a member selected from the group consisting of (a) dihalogen-1,3,5-triazinyl, (b) monohalogen-1,3,5-triazinyl wherein the halogen-free position of the triazinyl ring is substituted by a member selected from the group consisting of amino, phenylamino, monosulfophenylamino and methoxy, (c) radical of the formula $$\begin{array}{c} \text{Hal} \\ | \\ \text{C—N} \\ \text{X}_2 \diagup \quad \diagdown \text{C—} \\ \diagdown \text{C=X}_1 \\ | \\ \text{Hal} \end{array}$$

wherein one of $X_1$ and $X_2$ is =N—, and the other is a moiety selected from the group consisting of $$\diagdown\text{C}\diagup \quad \text{anh} \quad \diagdown\text{C}\diagup$$
$$\quad | \qquad\qquad\qquad\quad |$$
$$\;\text{Hal} \qquad\qquad\qquad \text{H}$$

and (d) β-halogen lower fatty acid radicals, the halogen having atomic numbers 17 and 35.

3. The monoazo dyestuff of the formula

[structure]

wherein of $X_1$ and $X_2$, the one is =N— and the other is $$\begin{array}{c} -\text{C}= \\ | \\ \text{Cl} \end{array}$$

4. The monoazo dyestuff of the formula

[structure]

wherein of $X_1$ and $X_2$, the one is =N— and the other is $$\begin{array}{c} -\text{C}= \\ | \\ \text{Cl} \end{array}$$

5. The monoazo dyestuff of the formula

[structure]

6. The monoazo dyestuff of the formula

[structure]

7. The monoazo dyestuff of the formula

[structure with CH$_3$—C=CH—CO—NH, Cl]

8. The monoazo dyestuff of the formula

[structure with NH$_2$ on triazinyl]

References Cited by the Examiner
UNITED STATES PATENTS

| | | | |
|---|---|---|---|
| 2,919,269 | 12/1959 | Nickel et al. | 260—146 |
| 2,943,085 | 6/1960 | Oesterlein | 260—146 |

FOREIGN PATENTS

| | | |
|---|---|---|
| 1,207,663 | 2/1960 | France. |
| 1,225,281 | 6/1960 | France. |

CHARLES B. PARKER, *Primary Examiner.*

LEON ZITVER, *Examiner.*

RICHARD K. JACKSON, REYNOLD J. FINNEGAN,
*Assistant Examiners.*